3,788,938
PYROLYZED STRUCTURES
Whitney R. Adams, Wilmington, Del., assignor to Scott
Paper Company, Philadelphia, Pa.
Application Apr. 10, 1969, Ser. No. 858,210, now Patent
No. 3,676,173, which is a continuation of abandoned
application Ser. No. 485,893, Sept. 8, 1965. Divided
and this application Sept. 28, 1971, Ser. No. 98,491
Int. Cl. C23c 9/06; D44d 1/094
U.S. Cl. 161—159                                                6 Claims

ABSTRACT OF THE DISCLOSURE

Porous, cellular structures which have been at least partially carbonized, which have greater strength at high temperatures, and which are capable of withstanding higher temperatures than could the structures prior to pyrolysis. A method for forming the above structures in which a first basic structure having a desired configuration and comprised of material having a low fusion or deterioration temperature is coated at even lower temperatures with an infusible resin which is capable of being cured to an infusible state at a temperature lower than the fusion or deterioration temperature of the material comprising the first basic structure, and the resulting coated structure is then subjected to elevated temperatures so that the basic structure is pyrolyzed and carbonized leaving a stronger, high-temperature-resistant structure substantially in the image of the first basic structure.

RELATED APPLICATIONS

This application is a division of U.S. patent application, Ser. No. 858,210, filed Apr. 10, 1969, now U.S. Pat. 3,676,173, which is a continuation of Ser. No. 485,893, filed Sept. 8, 1965, now abandoned.

This invention relates to novel pyrolyzed structures and a method for forming them and more particularly to porous, cellular structures which have been at least partially carbonized, which have greater strength at high temperatures, and which are capable of withstanding higher temperatures than could the structures prior to pyrolysis, and to a novel method for forming such structures.

There is a very urgent need for new high strength structures capable of maintaining their configuration and often providing structural support at elevated temperatures for use in many applications. This need is especially apparent in the fields of aerospace and aircraft construction and is also present in the area of chemical processing, such as where filtering and certain types of ion exchange processes are involved.

At present, it is well-known to construct a variety of open-celled, reticulated network-type structures from any one of several synthetic resin materials, such as polyurethane foam. In addition, there is a well-developed body of knowledge concerning the formation of many other types of three-dimensional cellular structures, such as honeycombs of various design, and similarly, many other cellular geometric structures. These latter structures can be formed from a variety of materials including glass fiber sheets, paper and different metal foils. However, by far one of the most inexpensive cellular structures known seems to be reticulated polyurethane foam which can be produced in the form of relatively large pieces and in practically any shape and the pore size of which can be varied over a wide range.

However, it is also apparent that structures characterized by the above description often have insufficient strength for many uses at normal temperatures and, furthermore, are very lacking in the required strength for many uses at elevated temperatures, that is, on the order of 450° F. and higher. Also, according to present methods of forming metallic honeycombs from materials having excellent physical properties, it is extremely expensive and difficult to design such structures in such a way as to allow their use at temperatures in this range, and even these structures will not withstand very high temperatures, that is, up to about 700° F. Such metal honeycombs are commonly formed by utilizing epoxy resin to cement and bond together crimped sheets of metal to form the individual cells. These structures are unreliable at temperatures in the neighborhood of 700° F., since the epoxy-metal bond tends to weaken and lose its strength characteristics at that temperature. To form such honeycomb structures by welding or other metal fabrication techniques is extremely expensive and often impossible where a cell of a small cross-section is desired.

The present invention provides a method for treating cellular structures formed from materials which fuse or melt at relatively low temperatures, that is, below about 400° F., such that the finally evolved product will assume substantially the same physical or structural shape of the relatively low temperature material and yet will provide a structure which is relatively stable and possesses greater strength at higher temperatures, that is, temperatures on the order of 700° F. or even greater.

Briefly, a first basic structure having a desired configuration and comprised of material having a low fusion or deterioration temperature is coated at even lower temperatures with an infusible resin which is capable of being cured to an infusible state at a temperature lower than the fusion or deterioration temperature of the material comprising the first basic structure. The resulting coated structure is then subjected to elevated temperatures so that the basic structure is pyrolyzed and carbonized leaving a stronger, high-temperature-resistant structure substantially in the image of said first basic structure.

It will be readily apparent to those concerned with new materials and their application that the method of the present invention provides a new and novel material or materials which are relatively low cost and can be employed successfully in a variety of applications where prior materials failed, demonstrating a performance which, in many cases, is superior to that of intricately fabricated structures previously employed which were constructed of more expensive materials. Broadly characterized, this material is a porous structure having a plurality of cells, all of which are open to the atmosphere, comprised largely of an infusible resin, which may or may not be pyrolyzed or carbonized wholly or in part, and which may be a coating upon a skeletal structure which is the pyrolyzed product of the material comprising the original structure. The materials of the invention can be employed in many processes wherein it is desired to have a three-dimensional cellular structure for use as a structural member or filtering matrix at elevated temperatures which was previously possible only by the use of painstakingly fabricated metallic or glass structures or, in certain applications, porous ceramic bodies. The invention also provides basic high temperature-resistant structures which can be coated additionally by high temperature processes.

Therefore, it is an object of the present invention to provide a process for forming high strength cellular or porous structures for use at relatively high temperatures.

It is a further object of the present invention to provide a process for forming relatively high strength structures for use at relatively high temperatures from relatively low strength structures and structures which have relatively low fusion or decomposition temperatures by inexpensive and uncomplicated fabrication methods.

It is an additional object of the invention to provide such structures having anisotropic properties.

It is a further object of the invention to provide a porous structure having open intercommunicating passages or cells, the material forming which has an interior or a carbonized product resulting from the at least partial pyrolysis of the material forming a basic structure, that is, material which is self-supporting above 200° F. and pyrolyzes above 500° F., and an exterior of an infusible resin which may be at least partially pyrolyzed.

It is a further object of the invention to provide such structures having isotropic properties.

It is still a further object of the invention to provide a structure comprised of a carbonized matrix of interconnecting strands and nexus forming reticulated randomly oriented and interconnecting cells, which strands are coated with an infusible resin which has been at least partially pyrolyzed.

Additional objects and advantages of the invention will be apparent from the following detailed description thereof, taken in conjunction with the following drawings in which.

One method of the present invention involves temporarily attaching infusible resin coating material upon the surface of a porous structure formed from material having a given fusion temperature and having open intercommunicating cells or passages. One way of accomplishing this is to wet the structure with a binding liquid and to deposit particulate resin coating material thereon as by dusting techniques, for example. The coating material has a fusion temperature when in the uncured condition below the fusion temperature of the material comprising the porous structure. The article coated thereby is then heated to a temperature which is above the fusion temperature of the particulate coating material and which is below the decomposition temperature and fusion temperature of the material forming the original porous structure until the coating material is fused over the surface of the structure into a substantially contiguous coating on its surface. The coating material is maintained at the above temperature until the material is cured into its infusible state and into a rigid, self-supporting condition.

The resulting structure is then subjected to a temperature which is below the volatilization temperature of the coating material but above the pyrolyzation temperature of the material forming the basic porous structure. In this manner, the material forming the basis structure is pyrolyzed off thereby reducing the weight of the structure. This results in an article having a shape substantially the same as the shape of a basic structure coated originally but formed of a material, the interior of which is a carbonized product of a material whose melting point is above 200° F. and which at least partially pyrolyzes above 500° F., and the exterior of which is formed of a different material having higher temperature characteristics and which may be at least partially pyrolyzed, but which is infusible.

Figure 1:
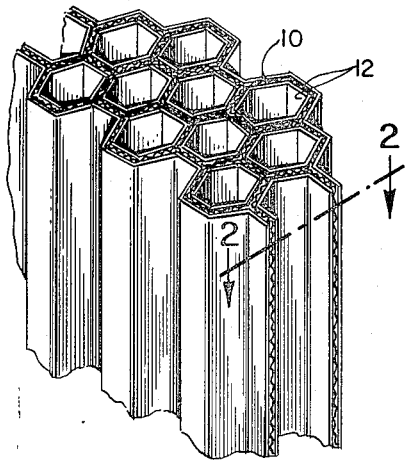
FIGS. 1 and 3 are enlarged views in perspective of two types of porous structures having open intercommunicating cells, which structures are typical of those which may be formed in accordance with the method of the invention.
Figure 3:
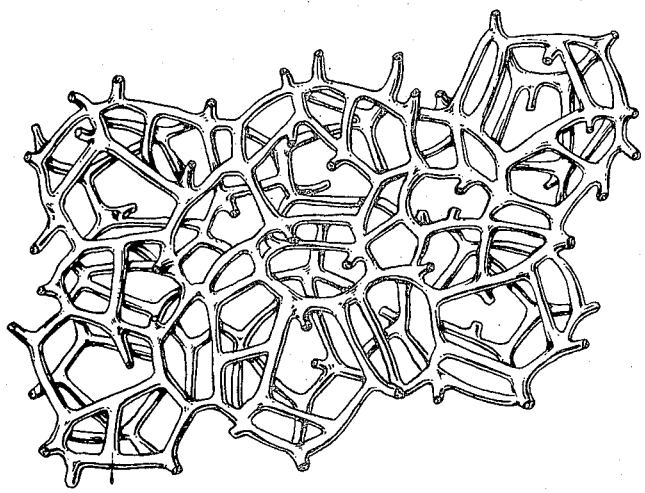

Initially, it should be understood that a large variety of structures may be coated by the method of the invention. Several examples of typical structures which may be successfully coated by means of the method of the invention are shown in FIGS. 1 and 3. The invention is very useful in coating structures of a porous nature having open interconnecting cells or passages, some of which may be extremely long relative to the cross-sectional area of the cells, that is, on the order of 24 inches or longer for a cell size of 1/16 square inch and less.

The cross-sectional areas of such passages or cells may also vary quite widely, the only basic limitation being the degree to which the coating material can be formed into a fine powder in order to be deposited on the interior of a structure as described above. However, it should be understood that the method of the invention could also be practiced on structures having much simpler shapes than those shown in the drawings, including even planar surfaces.

FIG. 1 shows a simple honeycomb structure, the cells of which could greatly be extended in length compared to the cross-sectional areas of the cells but basically representing a hexagonal honeycomb structure. FIG. 3 illustrates the structure of a relatively new basic material known commonly as reticulated polyurethane foam. These foams and methods of their preparation and formation are disclosed in U.S. Pat. 3,171,820. These foams are basically three-dimensional porous structures comprised of integrally interconnecting strands forming an isotropic skeletal outline of a multitude of polyhedrons whose faces are polygonal.

Obviously, various methods may be employed to temporarily attach and retain the powdered coating material upon the structure prior to fusion or melting of such coating material over the surface of the structure. One means successfully employed has been to coat the structure with a binding liquid by dipping or spraying. The amount of such binding liquid is not critical, it being sufficient merely to wet the surface of the structure and retain the desired amount of powdered resin material. Water is preferably employed as the wetting or binding liquid because of its ready availability, low cost and good physical characteristics such as polarity. In ordinary use, water which is available is sufficiently impure that it contains a minute quantity of different materials which serve as binders. These binders retain the particles of coating material upon the structure after the structure is heated and the liquid is volatized. In addition, the structure to be coated normally contains sufficient foreign matter to provide such binding agents normally as a result of the nature of their manufacture or chemical impurities in the material forming such structure.

However, it is recognized that often pure structures which have been cleaned or otherwise kept free of foreign matter may be hydrophobic. Furthermore, if pure water is applied to such structures to retain the coating powders, upon volatization of the water by heat, no material is left as a binder. Surprisingly enough, in instances where powdered coating material is applied to and retained on such a structure by pure water and the structure is subjected to a temperature sufficient to fuse the coating material prior to jerky movement or extensive transport of the structure, very satisfactory performance has been achieved.

In some cases, however, it has been found desirable to incorporate a small amount of a binding liquid such as an adhesive, for example, a water soluble latex-type adhesive, especially in those cases where the powder coated structure is to be transferred prior to fusion. Another satisfactory adhesive is a 5% solution of Flexbond 150, a copolymer emulsion manufactured by Air Reduction Chemical and Carbide Company, New York. Wetting agents may be employed in the binding solution to lower the surface tension and the contact angle of the solution so as to increase wettability of the structure and evenness of the coating. Such agents may comprise, for example, one of the Pluronic Series of wetting agents manufactured by Wyandotte Chemical Company, Michigan, and may be used alone or in combination with the adhesives an additives to the binding solution. It will be apparent that many types of compositions or solutions could be employed which would serve both as wetting solutions and binding agents and all of these are considered to be within the scope of the invention. Some additional specific agents which have been employed with success will be presented in the subsequent examples.

As will be evident from subsequently presented Examples III and IV, it is sometimes necessary to employ an adhesive which has dry tack on the surface of the porous body or basic structure. This may be required because of the reactivity of a particular infusible resin powder with the particular binding liquid employed and may also be desirable in some cases to provide a thinner coating on the structure than can be obtained with a liquid binding agent or adhesive. This is due to the fact that when a liquid is employed, a layer of resin powder having a thickness of several particles can be formed since the liquid is drawn up through the first adhered articles to the coated surface by capillary action providing means for attaching additional particles. In the case of a dry tack adhesive coating, the layer of resin powder can be restricted to a thickness of generally one particle since the particles must essentially contact the actual surface of the coated basic structure in order to be retained thereon. Example III also subsequently illustrates one reason why a relatively thin coating layer may be desirable. One way of obtaining an adhesive coating having dry tack is to coat with an adhesive solution or emulsion by means of the above described method and then to allow the adhesive to dry prior to dusting with the resin powders. Many of the water soluble latex-type adhesives will operate satisfactorily in this manner.

The coating materials employed in the coating of the basic structures include a large variety of commonly used thermosetting resins such as epoxy resins as well as a number of high temperature polymers such as the more recent polyimides, the polypyrones, and the polyoxazoles. The particle size of these materials is dictated by practical considerations of each application. Thus, it can be realized that if exceptionally large particles are attached to a structure, the resulting coating will be less even than that obtained by the use of coating materials of small particle size. It is also important that the particles be sufficiently small to penetrate into the interior of relatively thick cellular structures having deep passages. In this regard, it should be pointed out that there is a relationship between the pore size of the structure being coated and the particle size of the coating resin which will be apparent to one skilled in the art.

The particle size of the thermosetting resin has also been found to have an effect on the thickness of each coating applied to a structure. For example, if the particle size of a thermosetting resin is large, a thicker coating will result on the structure assuming that the binding liquid or adhesive means is the same in each instance. As will be described subsequently, in the case of phenolic thermosetting resins, it is important to apply a series of thin coatings rather than one thick coating due to the evolution of water vapor, as a phenolic resin transforms from the "B" stage into the "A" or fully cured stage. The coating must be sufficiently thin to allow such water to diffuse from the structure into the atmosphere.

One requirement of the infusible polymeric or thermosetting resin coating is that it be at least partially infusible after curing and be capable of passing through a curing stage so that it may be fused onto a structure at a temperature of from about 200° F. to about 500° F. and cured to a stable state, whereupon it assumes rigid characteristics at even higher temperatures. It can comprise any of the standard accepted commercial and industrial polymers that, in their final state, possess infusibility. For example, the phenol-aldehyde resins, commonly known as the Bakelite type resins, are satisfactory. These resins comprise those derived from a large family of phenols including phenol itself as well as the homologues of phenol such as the cresols, the xylenols, the resorcinols, the catechol, p,p′-di-hydroxydiphenyl-2-2 propane, etc. and the reactions with aldehydes such as formaldehyde, acetaldehyde, glyoxal, acrolein, furfuraldehyde or compounds engendering aldehyde such as trioxane, paraformaldehyde, hexanethylenetetramine and the like. The thermosetting epoxy resins as well as the other copolymers of epoxy resins with the phenolic resins, with the urea resins, the melamine resins, with the polyamide, with butadiene-acrylonitrile rubbers, etc. are satisfactory also and can be used in this process. Also satisfactory are the furane resins derived from furfuryl alcohol, furfuryl aldehyde or mixture of furfuraldehyde with furfuryl alcohol alone or in the presence of phenols. Some of the new high-heat resistant polymers which in their final state are infusible are particularly suitable for use in the process of this invention, such as the broad class of polybenzimidazoles of the general formula,

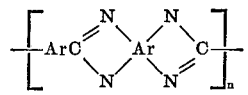

the arylene polyimides of the general formula

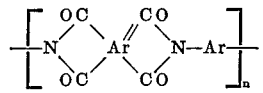

the poly Schiff bases of the general formula

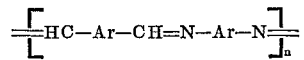

wherein Ar represents a bivalent aromatic group such as —$C_6H_4$—, —$C_6H_4$O—$C_6H_4$—, —$C_6H_4$—$C_6H_4$—,

—$C_6H_4CH_2C_6H_4$—

—$C_6H_4SC_6H_4$—, —$C_{10}H_6$—, etc.

It is also possible in certain instances and with certain types of thermosetting resins to employ a thermosetting resin in the "B" stage in the form of a liquid. It will be apparent to one skilled in the art that in this case the use of an adhesive or binding solution could be avoided and the basic porous structure could be merely immersed in the liquid "B" stage thermosetting resin and subsequently subjected to heat sufficient to cure the resin upon the structure. One resin which can be obtained in this form and employed satisfactorily in this manner is a solventless liquid phenolic "B" stage resin. Solid "B" stage phenolic resins in alcohol or acetone solutions are also satisfactory. Of the newer high-heat resistant polymers, dimethyl formamide or dimethyl acetamide solutions of the reaction product of pyromellitic anhydride and meta or para phenylene diamine are particularly useful.

The infusible resins used in the practice of this invention may be members of the class selected from the three-dimensional thermosetting resins of which the phenolic resins and the epoxy resins are illustrative examples, and the nonmelting aromatic polycarbonyl derivatives of which the polyamides, polyimides, polyazines, polyoxazoles, polypyrones, etc. are illustrative examples.

Since the coating, in its final state, is infusible and insoluble, it is necessarily applied to the reticulated structure while it is in the intermediate soluble, fusible, or soluble and fusible state, that is, uncured; thereafter cured or converted to the infusible state by any suitable means, such as by heat, catalyst or heat and catalyst.

After the structure has been wet with a binding liquid, infusible resin materials in a powdered or particulate form as described above are applied to the surface of the structure by any one of a number of known dusting techniques. The excess material may be left on or removed depending upon the thickness and uniformity of the coating desired.

The temperature to which the structure is subjected after temporary attachment of resin particles should be above the fusion temperature of the particulate coating material employed and below the decomposition temperature and fusion temperature of the material from which the basic structure is formed. It is necessary that the basic structure retain sufficient strength to support itself until the coating upon its surface becomes sufficiently rigid to increase the strength of and to support the structure. In the case of thermosetting resins, such as epoxies, this temperature should be equal to or higher than the curing temperature, that is, the temperature at which the epoxy resin passes into the "B" stage and irreversibly becomes directed toward a full cure. Normally, curing is accelerated by a higher temperature.

With some coating substances, other than thermosetting resins, it may be necessary to place an intermediate layer of a thermosetting resin in order to provide a structure which will withstand the higher temperatures necessary for application of a different coating composition, such as Teflon and nylon which must be applied at from about 500° F. and higher. Obviously, the temperature at which this fusion can be performed depends to a large extent upon the characteristics of the material forming the basic structure. Similarly, the temperature at which the composite structure is cured and the length of time of such curing depends to a large extent upon the characteristics of the coating substance applied. In any event, a contiguous coating is formed by the fusion or melting of the coating resin particles into one another so as to form a universal and continuous layer of resin material over the entire surface of the structure.

After the coated structure has been subjected to a temperature for a time period sufficient to fuse and to cure the coating resin into a rigid layer capable of supporting the structure, the temperature to which the structure is exposed may be elevated considerably in order to at least partially pyrolyze the basic structural material and reduce the weight of the entire structure. Depending upon the temperature to which the composite structure is subjected and the nature of the coating substance, the structure formed by the rigid coating may be also partially or completely pyrolyzed and oftentimes carbonized into a rigid, high strength, coated structure possessing good strength characteristics at elevated temperatures considerably higher than the temperatures which the original coated structure will withstand.

The physical characteristics of structures produced in accordance with the method of the invention depends to a large extent upon the design of the basic structure. That is, the structure illustrated by FIG. 1 would result in largely anisotropic properties being exhibited with the greatest strength being perhaps in a direction parallel to the longitudinal axis of the cells shown. It will be apparent that pyrolyzed structures having the configuration illustrated by FIG. 3 would possess generally isotropic properties and find further uses in a variety of applications. With structures similar to that of FIG. 3, the method of the invention is especially significant in that large masses of material can be formed by the process of the invention at a very low cost and in a large variety of easily controlled pore sizes and thicknesses. As mentioned in the above-referenced patent, the pore size and material thicknesses of polyurethane foam can be closely controlled and regulated.

The invention provides a variety of structures having open intercommunicating passages or cells comprised of materials having an interior which is a carbonized or pyrolyzed product of the material forming the basic structure and an exterior of a coating material which may be simply cured or additionally at least partially pyrolyzed. Details of the structure can be seen from exploded sectional views of FIGS. 1 and 3 shown by FIGS. 2 and 4, respectively, which illustrate construction features which are typical of the large variety of products capable of being formed by the method of the invention.

Figure 2:
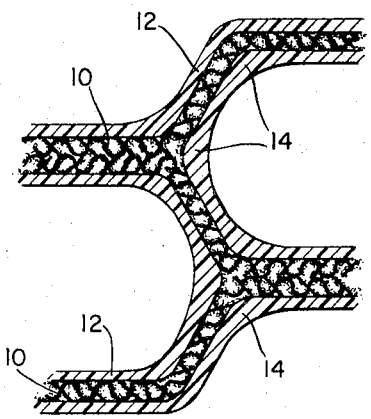
FIG. 2 is an enlarged segmented sectional view taken along line 2—2 of FIG. 1, illustrating the nature of the resulting structure.

Referring now to FIG. 1 of the drawings, there is shown in perspective a simple honeycomb structure formed in accordance with the method of the invention. The material comprising the walls of the cells forming the honeycomb structure has an interior 10 which is a woven fiber glass cloth impregnated with an organic polymer such as polyurethane. The layer 10 is coated on both surfaces with a layer 12 which comprises a thermosetting resin. The composite honeycomb structure has been subjected to a temperature sufficient to pyrolyze the polyurethane so as to leave an interior 10 of woven fiber glass cloth bonded at spaced points to the outer layers 12 of epoxy resin. In addition, the cloth 10 has a small amount of organic residue which is the product of pyrolysis of the polyurethane. FIG. 2 illustrates an enlarged segmented sectional view of a honeycomb structure of FIG. 1 and illustrates more clearly the nature of the interior layer 10 and the exterior layers 12.

Another very significant feature of the invention is illustrated by FIG. 2. It will be noticed that the regions of the coating 12 directly adjoining any corners of the structure or places where several surfaces intersect at an angle to each other forming what otherwise would be a sharp corner, have an enlarged buildup 14 of coating material 12 which tends to round off such corners and provide an outer surface to the coating 12 which is relatively smooth and free from sharp changes in direction or surface features.

As is well understood by those familiar with structural design, this feature provides that drastically increased strength will be had by the resulting structure since weaknesses inherent in sharp corners or surface details are eliminated. This effect has even more significant value when it is realized that even when materials such as the resin impregnated fiber glass cloth are employed which have large variation in sheet thickness or cross-section, these variations are compensated for by the above-mentioned tendency of the thermosetting coating resin to flow evenly over and fill up any valleys or depressions which would otherwise cause weakness and present a smooth contiguous outer surface to the structure when applied in accordance with the method of the invention. This feature may also be important when products of the invention are used for filtering or various chemical applications wherein flow through the structure is desired to be uniform and with as little resistance as possible.

FIG. 3 is a perspective view of a body of reticulated polyurethane foam which has been coated with a thermosetting resin in accordance with the method of the invention and the polyurethane core pyrolyzed out. Thus, the structure comprises a plurality of integrally interconnecting strands and nexus forming an isotropic skeletal outline of a polyhydron whose faces are polygonal. After pyrolysis, the above network forms a matrix of miniature interconnected passageways, since the interior of the entire structure is essentially hollow while the exterior coating of thermosetting resin is intact and provides the strength required by the structure. However, it has been found that in the process of pyrolysis, as the polyurethane achieves fusion temperature and begins to pyrolyze, pressure is created as the polyurethane increases in volume which ruptures the strands and nexus at various points, thereby forming breaks through the network and allowing some of the products of pyrolysis to escape from the interior.

Figure 4:
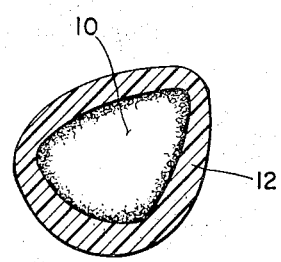
FIG. 4 is an enlarged cross-sectional view of one strand of the structure shown in FIG. 3.

FIG. 4 illustrates in greater detail the nature of the structure of a strand and shows a cross-sectional view of a typical strand. As can be seen, 10 designates the cavity which was previously occupied by the solid polyurethane strand and 12 illustrates the thermosetting resin coating which now comprises the substance forming the structure and presenting structural integrity. Adhering to the inner surface of the layer 12 is a gossamery or filamentary organic matter which comprises the infusible residue or products of pyrolysis from the polyurethane. It is believed that in some instances, an additional layer exists between the polyurethane and the layer 12 of thermosetting resin and comprises a reaction product of these two substances with each other.

In the case of a structure having the configuration shown in FIG. 3, the thickness of the coating upon each strand seems to increase toward the ends of each strand adjacent to respective nexus compared with the thickness in the middle of the strand. Furthermore, there is a concentration of coated material about each nexus of the skeletal structure. This seems to be caused to a large extent by surface tension of the coating thermosetting resin in the fused liquid state prior to its curing into a hard thermoset coating. Also in some instances, some of the smaller spaces or windows of the structure defined by a plurality of interconnecting strands have a solid sheet or film of fused thermosetting resin material across them, joining such strands. However, it should be thoroughly understood that the resulting structure will always be considerably porous and open-celled except in instances where extremely thick coatings are placed on the structure.

The strength of structures of the invention depends to a large extent on the strength of the particular infusible resin employed as a coating material in its cured or pyrolyzed state. Thus, for example, a block of reticulated polyurethane foam coated with an epoxy resin in its properly cured state will be stronger at ambient temperature than would such a structure at ambient temperature which had its interior pyrolyzed out and the epoxy resin at least partially pyrolyzed.

However, the same block of properly cured coated reticulated polyurethane foam is very weak at high temperatures of about 400° F. while such a structure in the pyrolyzed state will have a substantially greater strength at an even higher temperature of about 700° F. and above and, furthermore, will not be subject to thermal degradation during lengthy use at that temperature.

The following examples illustrate several specific embodiments of the invention and are not intended to limit the scope of the invention in any way.

EXAMPLE I

A 2" x 2" x 1" piece of reticulated polyurethane foam having approximately 10 pores per lineal inch and weighing 2.0 grams was immersed in an ethylene-vinyl acetate copolymer (EVA) emulsion (Flexbond, Grade 150, manufactured by Air Reduction Chemical and Carbide Company) containing 5% total solids. The sample was agitated within the above emulsion so as to remove all of the air and to insure that the entire surface of the foam would be completely contacted by the emulsion. The sample was then removed from the emulsion, drained and shaken to remove any excess adhesive. The foam was then air-dried with the aid of a fan at room temperature. The surface of the foam was observed to have good dry tack due to the adhesive. Epoxy resin powder in the "B" stage (Corvel ECA–1283, manufactured by the Polymer Corporation, Reading, Pa.) having a varied particle size of less than 60 mesh was then applied as a coating on the surface of the foam by the following procedure. A flat tray was employed having a light layer of the resin powder over the bottom of it. The sample was placed in the tray and then thoroughly dusted by a flooding technique in which the pores of the foam were almost completely filled with resin powder. The sample was then removed from the tray and turned in various directions and tapped gently to remove excess resin powder. The sample was inverted and the process was repeated to assure thorough application of the resin powder to the foam surface. The resin-powder-coated-foam sample was then transferred to a circulating hot air oven and heated for 10 minutes at 428° F. to accomplish fusion and curing of the powdered resin upon the surface of the foam structure. After cooling in air, the sample weighed 7.1 grams which means it increased in weight by 5.1 grams over the polyurethane foam sample uncoated. The coating therefore equaled 250% of the weight based on the weight of the original foam substrate.

The resulting epoxy-coated sample was then sandwiched between two steel plates .025 inch thick and 2⅛ inch square having a combined weight of 9.5 grams and returned to the oven where the composite sample was subjected to heat treatment for two hours at 572° F., resulting in almost complete pyrolysis of the polyurethane foam from the structure and curing and at least partial pyrolysis of the epoxy coating. After cooling, the assembly weighed 15.1 grams, representing a loss of weight of the coated foam structure of 1.5 grams or 21%.

The sample between the steel plates was placed in the oven and subjected to a dead weight load of 16 lbs. (4 p.s.i.) while the temperature was slowly elevated. Up to 572° F., no deflection was noted. At 572° F. a deflection of 1.6% of the original thickness was observed with no degradation of its structural integrity. At 626° F., the deflection measured was 4.7% of original thickness and at 644° F., a deflection of 48.0% was measured, representing total collapse for all practical purposes.

EXAMPLE II

A second piece of reticulated polyurethane foam having the same physical characteristics as the foam employed in Example I was coated and heat-treated by the same procedure as employed in Example I. In this case, however, the "B" stage epoxy resin powder contained 10% by weight of glass fibers mixed intimately with the resin. The glass fiber material employed was Owens-Corning-Fiberglas milled Fiberglas 701, each fiber having a diameter of about 9 microns and an average length of about 800 microns (1/32"). The pyrolyzed epoxy-glass-fiber-coated sample withstood a compressive stress of 4 p.s.i. at 698° F. with negligible deflection. The coating comprised 365% of the original weight of the foam substrate.

EXAMPLE III

A piece of polyurethane foam having the same physical characteristics as the sample employed in Example I was coated by means of the same procedures described in Example I. In this instance, the adhesive emulsion was air-dried to provide the foam surface with dry tack. The resin employed in this case was a "B" stage phenolic resin (Union Carbide Corporation BRP–4435) having a particle size of 60 mesh. Since phenolic resins yield water upon curing from the "B" stage to the "A" stage, it was necessary to apply the resin in thin multiple coats to allow evaporation of water vapor from the resin and to inhibit bubble formation during fusion and curing of each resin coating. The resin was applied in 4 successive coats and each coat was heated for 15 minutes at 302° F. to accomplish fusion and curing. The resulting phenolic-coated sample was subjected to heat treatment by heating it in an oven gradually to 572° F. over a period of one hour and maintaining it at 572° F. for two hours. The finished product had a coating amounting to 177% of the original foam substrate weight.

EXAMPLE IV

A piece of reticulated polyurethane foam having the same physical characteristics that were employed in Example I was coated by the same procedure employed in Example I. However, in this case, a "B" stage polyester-powdered-resin (General Electric Corporation, Alkanex 1003) having a particle size of 60 mesh was used. Because of the fact that a number of the ingredients contained in this resin are chemically sensitive to water, an air-dried adhesive was used as described in Example III. Also, as described in Example III, four multiple coats were applied in order to obtain adequate coverage and each coat was fused and cured upon the foam structure by subjecting the structure to 302° F. for 15 minutes. The sample was then heat-treated by the procedure described in Example III and the final coating amounted to 266% of the weight of the original substrate.

The following Tables I through V are self-explanatory and illustrate by relatively comparative figures some of the advantages of the invention. The samples in each table were pieces of polyurethane foam having approximately 10 pores per inch and coated with an epoxy resin, unless otherwise noted.

TABLE I.—EFFECT OF CURING CONDITIONS ON COMPRESSIVE STRENGTH

| Sample No. | Coating, percent | Curing conditions | | Start of deflection, °F. |
|---|---|---|---|---|
| | | Temp., °F. | Time, min. | |
| 1 | 236 | ¹ 446 | 15 | 203 |
| 2 | 250 | ² 572 | 120 | 563 |

¹ Normal cure.
² Pyrolyzed.

TABLE II.—EFFECT OF COATING WEIGHT ON COMPRESSIVE STRENGTH

| Sample No. | Coating, percent | Curing conditions | | Start of deflection, °F. |
|---|---|---|---|---|
| | | Temp., °F. | Time, min. | |
| 3 | 250 | ¹ 572 | 120 | 563 |
| 4 | 470 | ¹ 572 | 120 | 635 |

¹ Pyrolyzed.

TABLE III.—EFFECT OF 10% FIBERGLASS REINFORCEMENT ON COMPREHENSIVE STRENGTH

| Sample No. | Coating, percent | Curing conditions | | Start/defl. | Fiberglass as percent of coating |
|---|---|---|---|---|---|
| | | Temp., °F. | Time, min. | | |
| 5 | 470 | ¹ 572 | 120 | 635 | 0 |
| 6 | 365 | ¹ 572 | 120 | 671 | 10 |

¹ Pyrolyzed.

TABLE IV.—COMPRESSIVE STRENGTH AND DENSITY OF RETICULATED STRUCTURES

| | Temp. test, °F. | Apparent density, lb./cu. ft. | Load, p.s.i. at zero deflection |
|---|---|---|---|
| 10 p.p.i., urethane foam uncoated | 70 | 1.8 | Nil |
| Cured expoxy coated foam | 210 | 11.4 | 4 |
| Pyrolyzed epoxy coated foam | 662 | 4.9 | 4 |

TABLE V.—LOSS IN WEIGHT OF EPOXY COATED STRUCTURES AFTER PYROLYSIS

| Sample number | 7 | 8 | 9 |
|---|---|---|---|
| Urethane foam, g | 2.2 | 2.0 | 2.0 |
| Epoxy coated foam, g | 8.1 | 7.1 | 9.3 |
| Pyrolyzed coated foam, g | 6.0 | 5.6 | 7.0 |
| Loss on pyrolysis, g | 2.1 | 1.5 | 2.3 |

Note.—Epoxy coating mixture for samples 7 and 9 contained 10% fiberglas sample size 2″ x 2″ x 1″.

From the above it can be seen that the invention provides a method for preparing a large variety of new and novel structures and in a manner which allows the fabricating of structures from materials having excellent physical properties in the configuration of and by the use of structures made of very inexpensive materials which have quite undesirable properties for the particular applications involved. Furthermore, the invention provides a variety of new structural products which have good strength characteristics at relatively high temperatures and which can be further treated for advantageous application in numerous industrial areas. It will be apparent from the above that numerous modifications can be made in the method and products of the invention and these are intended to be within the spirit and scope of the invention.

What is claimed is:

1. A three dimensional network of strands integrally interconnected by thickened nexus at spaced-apart points so as to form the isotropic skeletal outline of a multitude of polyhedrons whose faces are polygonal, said strands and nexus being formed of an interior which comprises a carbonized product of polyurethane and an exterior which comprises an at least partially pyrolyzed product of a thermosetting resin which has a fusion temperature when in the uncured condition below the fusion temperature of polyurethane.

2. A structure according to claim 1, wherein said thermosetting resin is a phenolic resin.

3. A structure according to claim 1, wherein said thermosetting resin is urea formaldehyde.

4. A structure according to claim 1, in which said thermosetting resin is an epoxy resin.

5. A structure according to claim 1, wherein said thermosetting resin is a polyester resin.

6. A structure according to claim 1 wherein said exterior includes glass fibers.

References Cited
UNITED STATES PATENTS

| 3,210,233 | 10/1965 | Kummer et al. | 161—68 |
| 3,233,576 | 2/1966 | Voelker | 161—190 |
| 3,416,944 | 12/1968 | Pirrung et al. | 117—46 CC |
| 3,573,086 | 3/1971 | Lambdin | 161—182 |
| 3,666,526 | 5/1972 | Ettinger et al. | 117—46 CG |

WILLIAM J. VAN BALEN, Primary Examiner

U.S. Cl. X.R.

117—46 CB; 161—168